United States Patent Office 3,808,296
Patented Apr. 30, 1974

3,808,296
BICYCLIC PHOSPHORUS COMPOUNDS AND PROCESS FOR MAKING SAME
Heimo Brunetti, Reinach, Switzerland, assignor to Ciba-Geigy Corporation, Ardsley, N.Y.
No Drawing. Filed Apr. 17, 1972, Ser. No. 244,849
Claims priority, application Switzerland, Apr. 22, 1971, 5,846/71; Nov. 3, 1971, 16,044/71; Mar. 7, 1972, 3,311/72
Int. Cl. C07d 105/04; C08f 43/58
U.S. Cl. 260—927 R          12 Claims

ABSTRACT OF THE DISCLOSURE

Esters of 4-hydroxymethyl-1-phospha-2,6,7-trioxabicyclo[2,2,2]octan and p-hydroxyphenylcarboxylic acids are stabilizers for organic materials. They are prepared by reacting the 4-hydroxymethyl-1-phospha-2,6,7-trioxabicyclo[2,2,2]octan with a corresponding p-hydroxymethylcarboxylic acid.

---

The present invention relates to new compounds, their manufacture and their use for stabilizing organic material.

It is known to use derivatives of sterically hindered phenols as stabilizers for plastics against thermo-oxidative and light-induced degradation. It is also known to use phosphorus compounds as co-stabilizers together with phenolic antioxidants for stabilizing, such mixtures frequently having a synergistic effect. It is likewise known to use bicyclic phosphites, in which the phosphorus represents the bridgehead atom, as phosphorus compounds in such mixtures.

The surprising discovery has now been made that the new compounds of the General Formula I

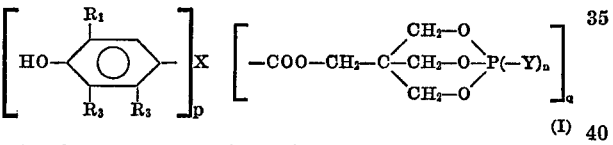

(I)

wherein X represents the radical of an alkane containing from 1–19 carbon atoms, in which not more than three bonds are formed between the same carbon atoms and the carboxyl and phenol groups, the radical of an aralkane, alkene, oxalkane or thiaalkane each containing from 2–19 carbon atoms, in which not more than three bonds are formed between the same carbon atom and the carboxyl and phenol groups, or represents the direct bond, $R_1$ and $R_2$ independently represent hydrogen, alkyl containing from 1–8 carbon atoms, cycloalkyl containing from 6–8 carbon atoms or aralkyl containing from 7–9 carbon atoms, with $R_1$ preferably representing alkyl, cycloalkyl or aralkyl containing the same number of carbon atoms as cited hereinbefore, $R_3$ represents hydrogen or methyl, preferably hydrogen, Y represents oxygen or sulphur, $p$ and $q$ independently represent 1 or 2 and $n$ represents 0 or 1, constitute stabilizers whose action is substantially better than the action of the above mentioned synergistic mixtures of phenolic antioxidants and phosphorus compounds.

Preferred compounds are those of the Formula I, wherein X represents the radical of an alkane containing from 1–9, preferably 1–6, but especially 1–3 carbon atoms, the radical of an alkene containing from 2–9, preferably 2–5 carbon atoms, —CH=CH— being particularly preferred, the radical of an oxaalkane or thiaalkane containing from 2–9, preferably 2 to 5 carbon atoms, —CH₂—S—CH₂— being particularly preferred, in which radicals not more than two bonds are formed between the same carbon atom and the carboxyl and phenol groups, or represents the direct bond, $R_1$ represents alkyl containing from 1–5, preferably 1–4 carbon atoms, or cycloalkyl containing from 6–8 carbon atoms, $R_2$ represents hydrogen, alkyl containing from 1–5 carbon atoms or cycloalkyl containing from 6–8 carbon atoms, but preferably represents alkyl containing from 1–4 carbon atoms, $R_3$ represents hydrogen, $p$ and $q$ independently represent 1 or 2 and $n$ represents 0 or 1.

Particularly preferred are compounds of the Formula I, wherein X represents the direct bond or one of the radicals

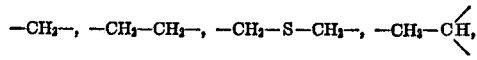

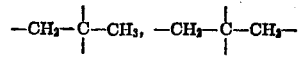

$R_1$ represents methyl, isopropyl or tert.-butyl, $R_2$ represents hydrogen, methyl, isopropyl or tert.butyl, $R_3$ represents hydrogen, $p$ and $q$ independently represent 1 or 2 and $n$ represents 0.

Where X in Formula I represents the radical of an alkane, it may be

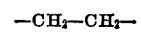

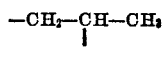

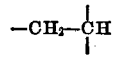

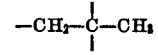

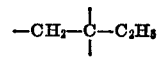

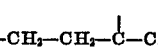

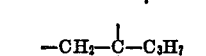

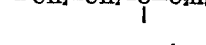

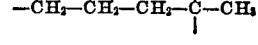

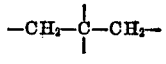

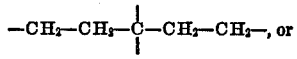

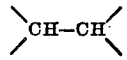

Where X in Formul I represents the radical of an alkene, it may be

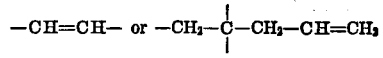

Where X in Formula I represents the radical of an aralkane, it may be

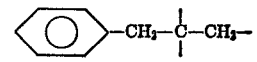

Where X in Formula I represents the radical of an oxa- or thialkane, it may be

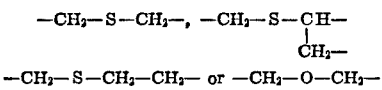

—CH₂—S—CH₂—CH₂— or —CH₂—O—CH₂—

If $R_1$ and/or $R_2$ are alkyl, they may represent methyl, ethyl, isopropyl, tert.butyl, sec.butyl, t-pentyl or t-octyl. If $R_1$ and/or $R_2$ are cycloalkyl, they may be cyclohexyl, α-methylcyclohexyl or cyclooctyl. If $R_1$ and/or $R_2$ are aralkyl, they may be benzyl, α-methylbenzyl or α,α-dimethylbenzyl.

The compounds of the Formula I may be manufactured in various ways: for example by reactng 1 mole of a compound of the General Formula II.

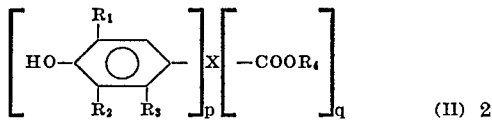

wherein $R_4$ represents a lower alkyl group, in particular the methyl or ethyl group, with $q$ moles of a compound of the Formula III

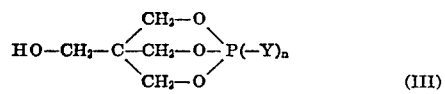

in the presence of catalytic amounts of a basic catalyst. In this reaction, $q$ moles of $R_4OH$ are split off.

The manufacture of the compounds of the Formula III is described in J. Chem. Soc. 84, 610 (1962).

This process of manufacture can be modified by initially reacting 1 mole of a trialkylphosphite, for example trimethyl or triethylphosphite, or of a triarylphosphite, for example triphenylphosphite, or of a corresponding phosphate or thiophosphate of the Formula IV

wherein R represents alkyl, for example methyl or ethyl, or aryl, for example phenyl, and Y and $n$ have the meanings given under Formula I, with 1 mole of pentaerythritol in the presence of a basic catalyst to give the compound of the Formula III and then reacting this latter in situ with ½ or 1 mole of a compound of the Formula II in the presence of the same or of another basic catalyst.

The surprising discovery has been made that the compounds of the Formula I can also be manufactured in good yields in such a way that 1 mole each of a compound of the Formula IV and pentaerythritol and 1 or ½ mole of the compound of the Formula II are reacted together. The reaction leads in the presence of a basic catalyst direct to the compounds of the Formula I. It was unexpected that this selective reaction firstly of three hydroxyl groups and then of the fourth hydroxyl group of the pentaerythritol in a single step process and with high yields is practicable.

It is also possible to manufacture the compounds of the Formula I by reacting 1 mole of a compound of the General Formula II with 1 or 2 moles of pentaerythritol in the presence of a basic catalyst, when a compound of the Formula V is formed:

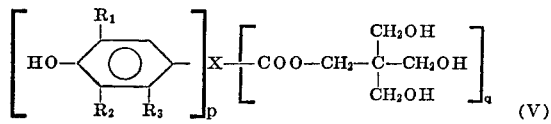

wherein $R_1$, $R_2$, $R_3$, X, $p$ and $q$ have the meanings given under Formula I.

Without any intermediate processing, the compound of the Formula V is reacted direct with $q$ moles of a compound of the Formula IV in the presence of the same or of another basic catalyst to give the compounds of the Formula I. It was unexpected that the reaction sequence of the hydroxyl groups of the pentaerythritol for the manufacture of the compounds of the Formula I can be reversed at will.

As basic catalysts there are used for example, alkali amides, for example sodium or lithium amide, alkali hydroxides, for example lithium, sodium or potassium hydroxide, alcoholates, for example sodium and magnesium alcoholates of methanol, ethanol or tert.butanol, or tertiary amines, such as triethylamine. Preferred basic catalysts are sodium methylate, sodium hydride and lithium amide.

As solvents, aliphatic or aromatic hydrocarbons, such as boiling range benzine, toluene or xylene may be used. The process is carried out preferably without a solvent.

It is possible to manufacture compounds of the Formula I in which $n=1$ by subsequently reacting compounds of the Formula I, wherein $n=0$, with oxidants such as hydrogen peroxide, cumene hydroperoxide, sulphur, disulphides or mercaptans. However, it is also possible to manufacture them by reacting a compound of the Formula III, in which $n=1$, with a compound of the Formula II or VI.

Compounds of the Formula I can also be manufactured by reacting a compound of the General Formula VI

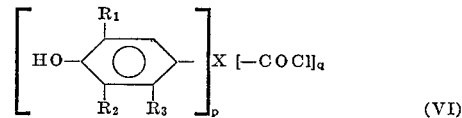

with 1 or 2 moles of a compound of the Formula III in the presence of a base to neutralize the hydrogen chloride which forms.

The compounds of the Formula I are used as stabilizers for organic substrates, examples of which are:

(1) Polymers, which are derived from singly or doubly unsaturated hydrocarbons, such as polyolefines, for example polyethylene which may optionally be cross-linked, polypropylene, polyisobutylene, polymethylbutene-1, polymethylpentene-1, polybutene-1, polyisoprene, polybutadiene, polystyrene, polyisobutylene, copolymers of the monomers based on the cited homopolymers, such as ethylene-propylene copolymers, propylene-butene-1 copolymers, propylene-isobutylene copolymers, styrene-butadiene copolymers, and terpolymers of ethylene and propylene with a diene, for example hexadiene, dicyclopentadiene or ethylidene-norbornene; mixtures of the above cited homo-polymers, for example mixtures if polypropylene and polyethylene, polypropylene and polybutene-1, propylene and polyisobutylene.

(2) Vinyl polymers which contain halogen, such as polyvinyl chloride, polyvinylidene chloride, polyvinyl fluoride, polychloropropene and chlorinated rubbers.

(3) Polymers which are derived from α,β-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylic ester copolymerizates.

(4) Polymers which are derived from unsaturated alcohols and amines and their acyl derivatives or acetals, such as polyvinyl alcohol, polyvinyl acetate, stearate, benzoate and maleate, polyvinylbutyral, polyallyl phthalate, polyallyl melamine and their copolymers with other vinyl compounds, such as ethylene/vinyl acetate copolymers.

(5) Homo- and copolymers which are derived from epoxides, such as polyethylene oxide or the polymerizates which are derived from bisglycidyl ethers.

(6) Polyacetyls, such as polyoxymethylene and polyoxyethylene, and those which contain ethylene oxide as comonomer.

(7) Polyphenylene oxides.

(8) Polyurethanes and polyureas.

(9) Polycarbonates.

(10) Polysulphones.

(11) Polyamides and copolyamides which are derived from diamines and dicarboxylic acids and/or from aminocarboxylic acids or the corresponding lactames, such as polyamide 6, polyamide 6/6, polyamide 6/10, polyamide 11, polyamide 12.

(12) Polyesters which are derived from dicarboxylic acids and dialcohols and/or from hydroxycarboxylic acids or the corresponding lactones, such as polyethylene glycol terephthalate, poly-1,4-dimethylol-cyclohexane terephthalate, and their starting materials, such as lower terephthalic alkyl ester.

(13) Cross-linked polymerizates which are derived from aldehydes on the one hand and from phenols, ureas and melamines on the other, such as phenol-formaldehyde, urea-formaldehyde and melamine-formaldehyde resins.

(14) Alkyd resins, such as glycerol-phthalic acid resins and their mixtures with melamine-formaldehyde resins.

(15) Unsaturated polyester resins, which are derived from copolyesters of saturated and unsaturated dicarboxylic acids with polyvalent alcohols, as well as vinyl compounds as cross-linking agents, and also their difficultly combustible modifications which contain halogen.

(16) Natural polymers, such as cellulose, rubber, proteins, and their chemically modified homologous compounds, such as cellulose acetates, propionate and butyrates, or the cellulose ethers, such as methyl cellulose.

The compounds of the Formula I are incorporated into the substrates in a concentration of 0.005 to 5% by weight referred to the material to be stabilized.

Preferably 0.05 to 2.0% by weight of the compounds, 0.1 to 1.0% by weight being particularly preferred, referred to the material to be stabilized is incorporated into it. The incorporation may take place before, during or after the polymerization, for example by blending in at least one of the compounds of the Formula I and optionally further additives by methods which are conventionally used in the art, before or during the moulding, or also by applying the dissolved or dispersed compounds to the polymer, optionally with subsequent evaporation of the solvent.

In the case of cross-linked polyethylene, the compounds are added before the cross-linking.

As further additives together with which it is possible to use the stabilizers, the following may be cited:

(1) Antioxidants of the amino- and hydroxyaryl series. In the case of the latter, the sterically hindered phenol compounds may be cited, e.g.:

2,2'-thiobis-(4-methyl-6-tert.butylphenol),
4,4'-thiobis-(3-methyl-6-tert.butylphenol),
2,2'-methylene-bis-(4-methyl-6-tert.butylphenol),
2,2'-methylene-bis-(4-ethyl-6-tert.butylphenol),
4,4'-methylene-bis-(2-methyl-6-tert.butylphenol),
4,4'-butylidene-bis-(3-methyl-6-tert.butylphenol),
2,2'-methylene-bis-[4-methyl-6-(α-methylcyclohexyl)-phenol],
2,6-di-2-hydroxy-3-tert.butyl-5-methylbenzyl)-4-methylphenol,
2,6-di-tert.butyl-4-methylphenol,
1,1,3-tris-2-methyl-(4-hydroxy-5-tert.butyl-phenyl)-butane,
1,3,5-trimethyl-2,4,6-tri-(3,5-di-tert.butyl-4-hydroxybenzyl)-benzene, esters of β - 4 - hydroxy-3,5-di-tert.butylphenyl-propionic acid with mono- or polyvalent alcohols, such as methanol, ethanol, octadecanol, hexane diol, nonane diol, trimethylhexane diol, thiodiethylene glycol, trimethylol ethane or pentaerythritol.

2,4-bis-octylmercapto-6-(4-hydroxy-3,5-di-tert.butyl-anilino)-s-triazine,
2,4-bis-(4-hydroxy-3,5-di-tert.butylphenoxy)-6-octylmercapto-s-triazine,
1,1-bis-(4-hydroxy-2-methyl-5-tert.butyl-phenyl)-3-dodecyl-mercapto-butane,
4-hydroxy-3,5-di-tert.butylbenzyl-phosphonic ester, such as dimethyl-, diethyl- or dioctadecyl ester,
(3-methyl-4-hydroxy-5-tert.butylbenzyl)-malonic acid-dioctadecyl ester,
S-(3,5-dimethyl-4-hydroxyphenyl)-thioglycolic acid octadecyl ester,
esters of bis-(3,5-di-tert.butyl-4-hydroxybenzyl)-malonic acid, such as didodecyl ester, dioctadecyl ester, 2-dodecylmercaptoethyl ester and p.tert.octylphenyl ester,
tris-(3,5-di-tert.butyl-4-hydroxybenzyl)-isocyanurate.

Among the aminoaryl derivatives, mention may be made of aniline and naphthylamine derivatives and their heterocyclic derivatives, e.g.:

phenyl-1-naphthylamine,
phenyl-2-naphthylamine,
N,N'-diphenyl-p-phenylenediamine,
N,N'-di-2-naphthyl-p-phenylenediamine,
N,N'-di-sec.butyl-p-phenylenediamine,
6-ethoxy-2,2,4-trimethyl-1,2-dihydroquinoline,
6-dodecyl-2,2,4-trimethyl-1,2-dihydroquinoline,
mono- and dioctyliminodibenzyl,
polymerized 2,2,4-trimethyl-1,2-dihydroquinoline.

When using the compounds of the Formula I in combination with the above cited amino compounds, it must be pointed out that, on account of the tendency of these latter to cause discoloration, the stabilized polymer no longer possesses such good color properties.

(2) Ultraviolet absorbers and light filters, e.g.:

(a) 2-(2'-hydroxyphenyl)-benztriazoles, for example the 5'-methyl-, 3',5'-di-tert.butyl-, 5'-tert.butyl-, 5-chloro-3'-, 5'tert.butyl-, 5-chloro-3'-tert.butyl-5-methyl-, 3'-sec.butyl-5'-tert.butyl-, 3'-[α-methylbenzyl]-5'-methyl-, 3' - [α - methylbenzyl]-5'-methyl-5-chloro-, 4'-octoxy-, 3',5'-di-tert.-amyl-, 3'-methyl-5'-carbomethoxyethyl-, 5-chloro-3',5'-di-tert.amyl- derivative, (b) 2,4 - bis - (2' - hydroxyphenyl)-6-alkyl-3-triazines, e.g. the 6-ethyl or 6-undecyl derivative, (c) 2-hydroxy-benzophenones, e.g. the 4-hydroxy, 4-methoxy, 4-octoxy, 4-decyloxy, 4-dodecyloxy, 4,2',4'-tri-hydroxy or 2'-hydroxy 4,4'-dimethoxy derivative, (d) 1,3 - bis - (2' - hydroxy-benzoyl)-benzenes, e.g. 1,2-bis - (2' - hydroxy-4'-hexyloxy-benzoyl)-benzene, 1,3-bis-(2'-hydroxy - 4' - octoxy-benzoyl)-benzene, 1,3-bis-(2'-hydroxy-4'-dodecyloxy-benzoyl)-benzene.

(e) Aryl esters of optionally substituted benzoic acids, e.g.: phenylsalicylate, octylphenylsalicylate, di-benzoyl-resorcinol, bis-(4-tert.butylbenzoyl)-resorcinol, benzoylresorcinol, 3,5 - di - tert.butyl-4-hydroxybenzoic acid-2,4-di-tert.butyl-phenyl ester, -octadecyl ester or -2-methyl-4,6-ditert.butylphenyl ester, (f) Acrylates, e.g.: α-cyano-β,β-diphenylacrylic acid ethyl- and isooctyl ester, α-carbomethoxy-cinnamic acidmethyl ester, α-cyano-β-methyl-p-methoxy-cinnamic acidmethyl and butyl ester, N-(β-carbomethoxy-vinyl)-2-methyl-indoline, (g) Nickel compounds, e.g.: Nickel complexes of 2,2-thiobis-(4-tert.octylphenol), such as the 1:1 and 1:2 complex, optionally with other ligands such as n-butylamine, nickel complexes of bis-(4-tert.octylphenyl)-sulphone, such as the 2:1 complex, optionally with other ligands, for example 2-ethylcapronic acid, nickel dibutyldithiocarbamate, nickel sauts of 4-hydroxy-3,5-di-tert.butylbenzylphosphonic acid monoalkyl esters, for example methyl, ethyl or butyl ester, the nickel complex of 2 - hydroxy - 4 - methyl-phenylundecyl-ketone-oxime, (h) Oxalic acid diamides, e.g. 4,4'-di-octyloxyoanilide, 2,2'-di-octyloxy-5,5'-di-tert.butyl-oxanilide, 2,2'-di-dodecyloxy-5,5'-di-tert.butyl-oxanilide, (i) 2,2,6,6-tetramethylpiperidines, for example 2,2,6,6-tetramethyl-4-steaoryloxypiperidine, bis-(2,2,6,6-tetramethyl-4-hydroxypiperidine)-sebacate.

(3) Phosphites, for example triphenylphosphite,
diphenylalkylphosphites,
phenyldialkylphosphites,
trinonylphenylphosphite,
trilaurylphosphite,
trioctadecylphosphite,
3,9-di-isodecyloxy-2,4,8,10-tetraoxa-3,9-diphospha-spiro-(5,5)-undecane,
tri(4-hydroxy,3,5-di-tert.butylphenyl)-phosphite.

(4) Compounds which decompose peroxide, e.g.

esters of β-thiodipropionic acid, for example lauryl, stearyl, myrystyl or tridecyl ester, salts of 2-mercaptobenzimidazols, for example the zinc salt and diphenylthiourea for polyolefines.

(5) Polyamide statilizers, e.g.

copper salts in combination with iodides and/or further phosphorus compounds and salts of divalent manganese.

(6) Basic costabilizers, e.g.

polyvinylpyrrolidone, melamine, benzoguanimine, triallyl cyanurate, dicyandiamide, urea derivatives, hydrazine derivatives, amines, polyamides, polyurethanes, alkali and alkaline earth salts of higher molecular saturated or unsaturated fatty acids, for example the laurates, myristates, palmitates, stearates, oleates or ricinoleates of calcium, magnesium, zinc or potassium. Such salts are added advantageously to the stabilizer according to the invention in concentrations of 0.1–40% by weight, preferably 1–10% by weight, before the incorporation into the material to be protected.

(7) PVC stabilizers such as organic tin compounds, organic lead compounds and Ba/Cd salts of fatty acids.

(8) Nucleination agents, e.g. 4-tert.butylbenzoic acid, adipic acid, diphenylacetic acid.

(9) Other additives, such as plasticizers, lubricants, for example glycerol monostearate, emulsifiers, antistatic agents, flame-proofing agents, pigments, carbon black asbestos, glass fibres, china clay, talcum.

The following examples describe the invention in more detail, the parts and percentages being by weight.

EXAMPLE 1

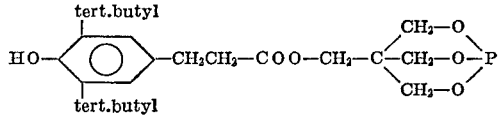

13.6 g. (0.1 mole) of pentaerythritol and 13.6 g. (0.11 mole) of trimethyl phosphite are introduced into a reaction vessel with a descending condenser and connected at the outlet side with a freezing trap and to a vacuum unit, treated with 0.25 g. (4.6 mole) of sodium methylate and the mixture is heated to 110° C. The methanol formed during the reaction is distilled off continuously. When the theoretical amount of methanol (12 ml.) has been distilled, the reaction mixture is heated briefly to 140° C., then treated under nitrogen with 32.2 g. (0.11 mole) of 3-(3,5-ditert.butyl-4-hydroxyphenyl)-propionic acid methyl ester, in the process of which a homogeneous melt is formed. While stirring, an additional 0.2 g. of sodium methylate is added and the reaction vessel is evacuated. The methanol formed during the reaction distills into the freezing trap. The temperature is kept for 60 minutes at 140° C., then raised to 160° C. and kept there at for a further hour. The homogeneous melt is cooled to 100° C. After discharging with nitrogen, 30 ml. of ethanol and 0.5 ml. of glacial acetic acid are added all at once and the warm solution is cooled, in the course of which the product crystallizes. The product is filtered with duction, washed with a small amount of ice-cold ethanol and dried, to yield 34 g. of 4-hydroxy-methyl-1-phospha-2,6,7-trioxabicyclo[2,2,2]octane - 3 - (3,5-ditert. butyl-4-hydroxyphenyl)-propionate (stabilizer No. 1), which melts at 154–155° C. The compound may be recrystallized from ethanol or ligroin.

If the above example the 3-(3,5-ditert.butyl-4-hydroxyphenyl)-propionic acid methyl ester is replaced by the corresponding alkyl substituted 4-hydroxy-phenyl-propionic acid methyl ester, the corresponding esters of the 4-hydroxy-methyl-1-phospha - 2,6,7 - trioxabicyclo[2,2,2] octane of Table 1 with the indicated melting points are obtained by carrying out the process in an analogous manner:

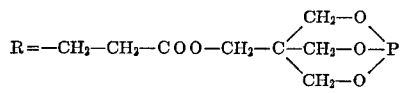

TABLE 1

| | Melting point, °C. | Stabilizer No. |
|---|---|---|
| tert.butyl, CH₃ (HO—⟨○⟩—R) | 78 | 2 |
| iso-propyl, iso-propyl (HO—⟨○⟩—R) | 102 | 3 |
| tert.butyl, H (HO—⟨○⟩—R) | 150 | 4 |
| tert.butyl, CH₃, CH₃ (HO—⟨○⟩—) | ---------- | |

EXAMPLE 2

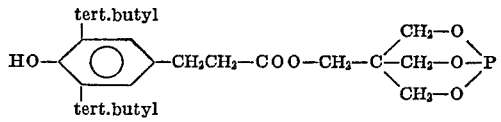

13.6 g. (0.1 mole) of pentaerythritol, 13.6 g. (0.11 mole) of trimethyl phosphite, and 32.2 g. (0.11 mole) of 3-(3,5-ditert.butyl - 4 - hydroxyphenyl)-propionic acid methyl ester are introduced into a reaction vessel with a descending condenser and connected at the outlet side with a freezing trap and to a vacuum unit. The mixture is heated to 70° C. and, while stirring slowly, treated with 0.5 g. of sodium methylate. The internal temperature is raised to 110° C., in the course of which the methanol formed during the reaction is distilled off. The evolution of methanol ceases when about 12 ml. have passed over. The temperature of the reaction mixture is then raised to 160° C. over the course of 30 minutes, the reaction vessel evacuated and the temperature maintained for a further hour.

The homogeneous melt is cooled to 100° C. After discharging with nitrogen, 30 ml. of ethanol and 0.5 ml. of glacial acetic acid are added all at once and the warm solution is cooled, in the course of which the product crystallizes. The product is filtered with suction, washed with a small amount of ice-cold ethanol and dried at 60° C., to yield 36 g. of 4-hydroxymethyl-1-phospha-2, 6,7-trioxabicyclo[2,2,2]octane - 3 - (3,5-ditert.butyl-4-hydroxyphenyl)-propionate (stabilizer No. 1), which melts at 154–155° C. The compound may be recrystallized from ethanol or ligroin.

EXAMPLE 3

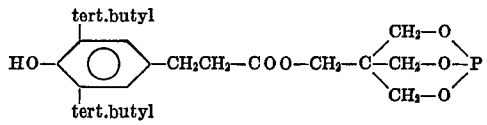

13.6 g. (0.1 mole) of pentaerythritol and 32.2 g. (0.11 mole) of 3-(3,5-ditert.butyl-4-hydroxyphenyl)-propionic acid methyl ester are introduced into a reaction vessel with a descending condenser and connected at the outlet side with a freezing trap and to a vacuum unit. The mixture is heated to 100° C. and 0.25 g. of sodium methylate is added. The reaction vessel is evacuated and then the mixture is heated to 150° C., in the process of which methanol distills into the freezing trap. When the theoretical amount (4 ml.) has passed over, the mixture is cooled to 90° C. and treated with 13.6 g. (0.11 mole) of trimethyl phosphite and a further 0.25 g. of sodium methylate. The internal temperature is raised to 110° C., and in the course of about 3 hours a further 12 ml. of methanol distill into the freezing trap. This second step of the reaction is carried out at normal pressure. Finally, the reaction vessel is briefly evacuated, the temperature brought to 100° C. and a mixture of 30 ml. of ethanol and 0.5 ml. of glacial acetic acid is added all at once. The warm solution is cooled, in the process of which the product crystallizes. The product is filtered with suction, washed with a small amount of ice-cold ethanol and dried at 60° C. to yield 30 g. of 4-hydroxymethyl-1-phospha-2,6,7-trioxabicyclo[2,2,2]octane - 3 - (3,5 - ditert.butyl-4-hydroxyphenyl)-propionate (stabilizer No. 1), which melts at 154–155° C. The compound may be recrystallized from ethanol or ligroin.

EXAMPLE 4

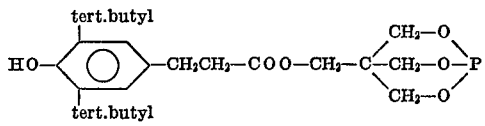

16.4 g. of 4-hydroxymethyl-1-phospha-2,6,7-trioxabicyclo-2,2,2-octane are dissolved in 100 ml. of dimethyl acetamide. While stirring vigorously, a solution of 33 g. of 3-(3,5 - ditert.butyl-4-hydroxyphenyl)-propionic chloride in 100 ml. of dimethyl acetamide is added dropwise, in the process of which the temperature rises to 45° C. The mixture is stirred for 1 hour at 80° C., cooled and poured into 2 litres of water. The product which initially separates out in the form of an oil crystallizes in the course of several hours. It is filtered with suction, then recrystallized from the 4-fold amount of alcohol to yield 4 - hydroxymethyl - 1 - phospha - 2,6,7 - trioxybicyclo[2, 2,2]octane - 3 - (3,5 - ditert.butyl-4-hydroxyphenyl)-propionate (stabilizer No. 1), which melts at 156° C.

EXAMPLE 5

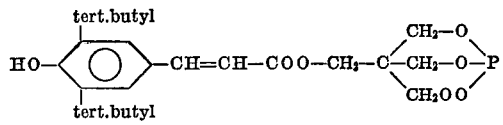

30.4 g. of 3-(3,5-ditert.butyl-4-hydroxyphenyl)-acrylic acid ethyl ester and 16.4 g. of 4-hydroxymethyl-1-phospha-2,6,7-trioxabicyclo[2,2,2]octane are heated together to 150° C., when a homogeneous melt is formed. While stirring, 0.4 g. of lithium amide is added, the mixture heated then to 160° C. and this temperature kept for 12 hours. Upon cooling, the reaction mixture is treated with 250 ml. of toluene, filtered and evaporated. The product is obtained in crystalline form by adding hexane. The resulting 4-hydroxymethyl - 1 - phospha-2,6,7-trioxabicyclo [2,2,2]octane-3-(3,5 - ditert.butyl - 4 - hydroxyphenyl)-acrylate (stabilizer No. 5) melts at 197° C. after repeated recrystallization from toluene.

EXAMPLE 6

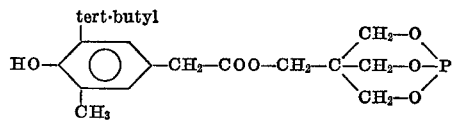

23.6 g. of 3-tert.butyl-4-hydroxy-5-methyl-phenylacetic acid methyl ester and 16.4 g. of 4-hydroxymethyl-1-phospha-2,6,7-trioxabicyclo[2,2,2]-octane are heated together to 130° C. and the resulting homogeneous melt is treated, while stirring, with 0.4 g. of lithium amide. The reaction vessel is evacuated and the temperature is kept for 2 hours at 130° C. After discharging with nitrogen and cooling, the reaction mixture is treated with 150 ml. of toluene, filtered and evaporated. The product is obtained in crystalline form by adding hexane to the residue and may be recrystallized from a mixture of toluene and hexane. The resulting 4-hydroxymethyl-1-phospha-2,6,7-trioxabicyclo[2,2,2]octane-3-tert.butyl-4-hydroxy - 5 - methyl-phenyl-acetate (stabilizer No. 6) has a melting point of 99° C.

If in this example the 3-tert.butyl-4-hydroxy-5-methyl-phenyl-acetic acid methyl ester is replaced by an equivalent amount of 3,5-dimethyl-4-hydroxy-phenylacetic acid methyl ester and the process is otherwise carried out in analogous manner, the 4-hydroxymethyl-1-phospha-2,6,7-trioxabicyclo[2,2,2]octane - 3,5 - dimethyl - 4 - hydroxyphenyl acetate (stabilizer No. 7) is obtained with a melting point of 150° C.

EXAMPLE 7

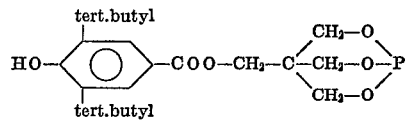

26.4 g. of 3,5-ditert.butyl-4-hydroxybenzoic acid methyl ester and 16.4 g. of 4-hydroxymethyl-1-phospha-2,6,7-trioxabicyclo[2,2,2]octane are heated together to 120° C. and the resulting homogeneous melt is treated with 0.2 g. of lithium amide. The flask is evacuated, the temperature brought to 150° C. and kept thereat for 2 hours. After discharging and cooling, the mixture is treated with 150 ml. of toluene, and the solution is then boiled and filtered. The product crystallizes out on evaporation of filtrate and can be recrystallized from toluene. The resulting 4-hydroxymethyl - 1 - phospha-2,6,7-trioxabicyclo [2,2,2]octane-3,5-ditert.butyl - 4 - hydroxybenzoate (stabilizer No. 8) melts at 200° C.

EXAMPLE 8

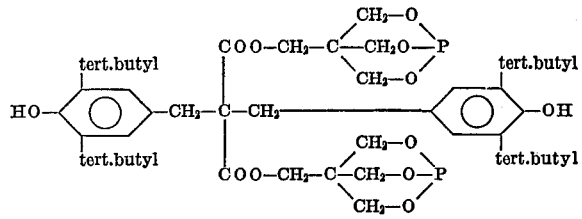

56.8 g. of bis-(3,5-ditert.butyl - 4 - hydroxybenzyl)-malonic acid dimethyl ester and 32.8 g. of 4-hydroxymethyl - 1 - phospha-2,6,7-trioxabicyclo[2,2,2]-octane are introduced into 100 ml. of toluene and the mixture is heated to the boil. The resulting homogeneous solution is cooled to 90° C. and treated with 0.3 g. of lithium amide. The reaction vessel is carefully evacuated, the methanol which has formed and the toluene being completely distilled off at an external temperature of 105–120° C. The melt is treated with 100 ml. of toluene, the solution boiled and filtered. The viscose residue which remains after evaporation of the filtrate is titrated with 150 ml. of hexane, when it becomes solid and crystalline, yielding the bis-(4-hydroxymethyl - 1 - phospha-2,6,7-trioxabicyclo[2,2,2]octane) - bis(3,5 - ditert.butyl - 4 - hydroxybenzyl)-malonate (stabilizer No. 9) with a melting point of 70° C.

If in this example the bis-(3,5-ditert.butyl-4-hydroxybenzyl)-malonic acid dimethyl ester is replaced by an equivalent amount of 2 3,5-dialkyl - 4 - hydroxybenzylmalonic acid dialkyl ester of the following Table 2, and the process is otherwise carried out in analogous manner, the corresponding bis-(4-hydroxymethyl-1-phospha-2,6,7-trioxabicyclo[2,2,2]octane)-3,5-dialkyl - 4 - hydroxybenzylmalonates are obtained in the form of slightly yellowish oils.

EXAMPLE 9

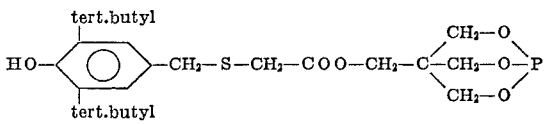

16.4 g. of 4-hydroxymethyl-1-phospha-2,6,7-trioxabicyclo [2,2,2] octane and 32.4 g. of S-(3,5-ditert.butyl-4-hydroxybenzyl)-thioglycolic acid methyl ester are heated together to 70° C., in the process of which a homogeneous melt forms. Upon addition of 0.4 g. of lithium amide, the melt is heated to 120° C. and methanol is distilled off. The melt is cooled, treated with 200 ml. of toluene, the resulting solution boiled, filtered and evaporated. The residual oil is titrated with 100 ml. of ligroin, in the process of which crystallization commences. After filtration and drying, 4 - hydroxymethyl-1-phospha - 2,6,7 - trioxabicyclo [2,2,2] octane-S-(3,5-ditert.butyl-4-hydroxybenzyl)-thio-

TABLE 2

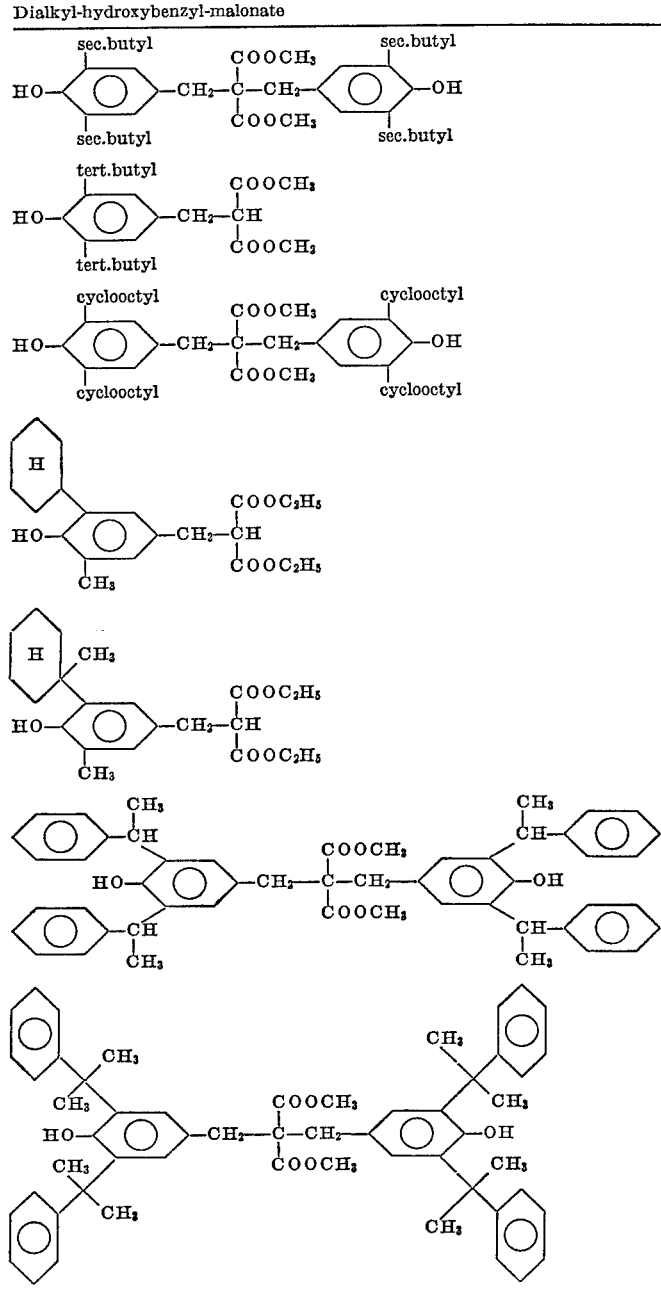

| Dialkyl-hydroxybenzyl-malonate | Reaction product |
| --- | --- |
| | Yellowish oil. |
| | Oil stabilizer No. 10. |
| | Wax-like solids. |
| | Oil. |
| | Oil. |
| | Oil. |
| | Oil. | glycolate (stabilizer No. 11) is obtained, which sinters at 70° C.

EXAMPLE 10

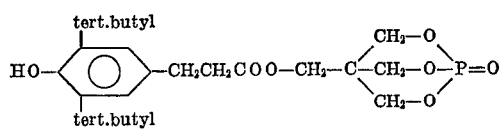

1st step 8.2 g. of 4-hydroxymethyl-1-phospha-2,6,7-trioxabicyclo [2,2,2]-octane are dissolved in 160 ml. of absolute alcohol. While stirring, 15 g. of a 70% solution of cumene hydroperoxide in cumene are added. In the process, the mixture heats to about 55° C. Upon cooling, a precipitate forms which is filtered off and dried, to yield 4-hydroxymethyl - 1 - oxophospha-2,6,7-trioxabicyclo [2,2,2]-octane with a melting point of 220° C.

2nd step 32.2 g. of 3-(3,5-ditert.butyl-4-hydroxyphenyl)-propionic acid methyl ester and 18.0 g. of 4-hydroxymethyl-1-oxophospha-2,6,7-trioxabicyclo [2,2,2]-octane are heated together to 150° C. While stirring, 0.4 g. of sodium methylate is added, the mixture heated to 160° C. and this temperature maintained for 12 hours. Upon cooling, the mixture is treated with 250 ml. of toluene and filtered hot. The crystals which form after cooling are collected by suction filtration and dried, to yield 4-hydroxamethyl-1-oxophospha - 2,6,7 - trioxabicyclo [2,2,2] octane-3-(3,5-ditert.butyl-4-hydroxyphenyl)-propionate (stabilizer No. 12) with a melting point of 183° C.

EXAMPLE 11

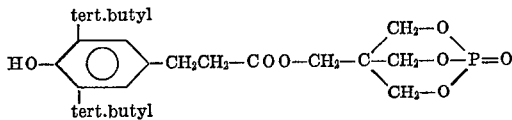

42.4 g. of 4-hydroxymethyl-1-phospha-2,6,7-trioxabicyclo [2,2,2] octane-3-(3,5-ditert.butyl-4-hydroxyphenyl)-propionate (stabilizer No. 1, Example 1) are dissolved in 500 ml. of dry ether by short boiling. The solution is treated with 25 g. of a 70% solution of cumene hydroperoxide in cumene and the resulting mixture is stirred for 3 hours at room temperature. In the process, the product slowly falls out in the form of a white precipitate. The product is filtered off and recrystallized from alcohol to yield the 4-hydroxymethyl-1-oxophospha-2,6,7-trioxabicyclo [2,2,2] - octane-3-(3,5-ditert.butyl-4-hydroxyphenyl)-propionate (stabilizer No. 12) with a melting point of 183° C.

EXAMPLE 12

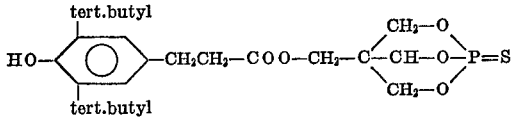

42.4 g. of 4-hydroxymethyl-1-phospha-2,6,7-trioxabicyclo [2,2,2] octane-3-(3,5-ditert.butyl-4-hydroxyphenyl)-propionate (stabilizer No. 1, Example 1) are boiled under reflux for 4 hours with 3.2 g. of sulphur and 0.2 g. of sodium sulphide in 100 ml. of toluene. The solid which has precipitated on cooling of the reaction mixture is filtered with suction and recrystallized from toluene. The product is filtered and dried to yield the 4-hydroxymethyl-1-thiophospha-2,6,7-trioxabicyclo [2,2,2] octane-3-(3,5-ditert.butyl - 4 - hydroxyphenyl) propionate (stabilizer No. 13) with a melting point of 188° C.

In the following use examples, the stabilizers listed in Table 3 representing prior art were tested as comparative compounds conjointly:

TABLE 3

| Stabilizer No. | Chemical name |
|---|---|
| 14 | pentaerythritol-tetrakis-[3-(3',5'-ditert.butyl-4-hydroxyphenyl)]-propionate |
| 15 | tris-nonylphenyl-phosphite |
| 16 | 1,3,5-tris-(3',5'-ditert.butyl-4'-hydroxybenzyl)-2,4,6-trimethylbenzene |
| 17 | diethyl-(3,5-ditert.butyl-4-hydroxybenzyl)-phosphonate |
| 18 | thiodiglycol-bis-[3-(3',5'-ditert.butyl-4-hydroxyphenyl)]-propionate |
| 19 | 1,1-bis-(5-tert.butyl-4-hydroxy-2-methylphenyl)-butane |
| 20 | 2,2'-methylene-bis(4-ethyl-6-t-butyl)-phenol |
| 21 | nickel-bis-(3,5-ditert.butyl-4-hydroxybenzyl)-ethyl-phosphonate |
| 22 | 2-(2'-hydroxy-5'-methylphenyl)benztriazole |
| 23 | 4-hydroxymethyl-1-phospha-2,6,7-trioxabicyclo-[2,2,2]-octane-stearate (M.P. 49° C.) |
| 24 | octadecyl-3-(3',5'-ditert.butyl-4'-hydroxyphenyl)-propionate |
| 25 | tris-(3,5-ditert.butyl-4-hydroxybenzyl)-isocyanurate |

EXAMPLE 13

The additives listed in Table 4 are homogeneously incorporated in each case over Labor-Gelimat (Messrs. Draiswerke) into polyamide 12 (relative viscosity=1.9; 0.5% in m-cresol) in a concentration of 1.0%, and these mixtures are pressed at 260° C. into 1 mm. sheets, from which 1 cm. wide test strips are punched. The test specimens without additives which are required for purposes of comparison are manufactured in analogous manner. The test of the effectiveness of the additives incorporated in the test strips is carried out by oven ageing in a forced draught oven at 150° C. The end product is defined as the time taken to reach the "brittle point." This is reached when failure occurs on bending the test specimen by hand. (Table 4, column 3.) Table 4, column 2 indicates discolourations caused by the additives in the polyamide test specimens as received before the oven ageing. An empirical colour scale is used, in which 5 denotes colourlessness, 4 a just percentible, slight discolouration, and 3, 2 and 1 denote successively stronger discolouration.

TABLE 4

| Stabilizer number | Colour of test specimens as received | Oven ageing at 150° C. days to brittle point |
|---|---|---|
| Without additive | 5 | 5 |
| 1 | 5 | 30 |
| 2 | 5 | 28 |
| 3 | 5 | 27 |
| 4 | 5 | 21 |
| 9 | 5 | 30 |
| 11 | 5 | 13 |
| 13 | 5 | 14 |
| Comparative products | | |
| 14 | 3 | 10 |
| 14 plus 15 (0.5%) | 3 | 10 |
| 16 | 3 | 8 |
| 16 plus 15 (0.5%) | 5 | 9 |
| 17 | 5 | 6 |
| 18 | 3 | 11 |

EXAMPLE 14

The additives listed in Table 5 are sprinkled dry in the indicated concentrations on polyamide 12 granules (relative viscosity=1.9; 0.5% in m-cresol) and the coated granules are regranulated in each case at 260° C. in a single screw extruder. Tensile bars 1 mm. thick are extruded from the granules at 240° C. in an injection moulding machine (Arburg); each bar measures 30 x 6 mm.

The test of the effectiveness of the additives incorporated into the test specimens is carried out by means of oven ageing in a forced draught oven at 150° C. The thermooxidative degradation of the material during the oven ageing is followed up in three different ways:

(a) periodic measurement of the relative viscosity of a 0.5% solution in m-cresol (Table 5, columns 2-6);
(b) determination of the time until brittle point is reached, as described in Example 13 (Table 5, column 7);
(c) periodic determination of the tensile strength and of the time taken to the decrease in yield stress to 80% of its initial value (Table 5, column 8).

TABLE 5

| Bar No. concentration | (a) Relative viscosity of solution after days of oven ageing at 150° C. | | | | | (b) Days taken to brittle point | (c) Days taken to 80% residual yield stress |
|---|---|---|---|---|---|---|---|
| | 0 | 5 | 10 | 20 | 30 | | |
| Without additive | 1.90 | 1.4 | | | | 1 | 1 |
| 1 (0.5%) | 1.85 | 1.80 | 1.68 | 1.58 | | 17 | 21 |
| 1 (1.0%) | 1.85 | 1.82 | 1.78 | 1.70 | 1.62 | 30 | 27 |
| 9 (1.0%) | 1.90 | 1.84 | 1.79 | 1.74 | 1.61 | 31 | 28 |
| Comparative products | | | | | | | |
| 14 (1.0%) | 1.84 | 1.75 | 1.61 | 1.50 | | 10 | 12 |
| 14 (1.0%) plus 15 (0.5%) | 1.85 | 1.76 | 1.63 | 1.55 | | 11 | 13 |
| 17 (1.0%) | 1.87 | 1.61 | 1.42 | | | 6 | 6 |
| 23 (0.5%) plus 24 (0.5%) | 1.85 | 1.51 | | | | 4 | 4 |

As can be seen from Table 5, a greater heat stabilizing effect is attained with the stabilizers according to the invention, judged by all three criteria, than with a commercially available stabiliser.

EXAMPLE 15

The additives listed in Table 6 are homogeneously incorporated in polyamide 12 (relative viscosity=1.9; 0.5% in m-cresol) in a concentration of 1.0% over Labor-Gelimat (Drainswerke) and these mixtures are pressed into 1 mm. thick sheets at 260° C. from which 1 cm. wide test strips are punched. The test specimens without additives required for purposes of comparison were manufactured in analogous manner.

The test of colour stability (yellowing) of the additives incorporated in the test strips is carried out by means of exposure in a xenotest device. To assess the intensity of discolourations which arise an empirical colour scale was used in which 5 denotes colourlessness, 4 a just perceptible, slight discolouration, and 3, 2 and 1 denote successively stronger discolourations. Table 6 gives the colour values directly after the incorporation and after an exposure time of 1000 hours.

TABLE 6

| Stabilizer number | Colour evaluation | |
|---|---|---|
| | After incorporation | After 1,000 hours xenotest |
| 1 | 5 | 5 |
| 2 | 5 | 5 |
| 3 | 5 | 5 |
| 4 | 5 | 5 |
| 5 | 5 | 5 |
| 6 | 5 | 5 |
| 7 | 5 | 5 |
| 8 | 5 | 5 |
| 9 | 5 | 5 |
| 10 | 5 | 5 |
| 11 | 5 | 5 |
| 12 | 5 | 5 |
| 13 | 5 | 5 |
| Comparative Products | | |
| 14 | 3 | 2 |
| 14 plus 15 (0.5%) | 4 | 3 |
| 16 | 3 | 3 |
| 18 | 3 | 1 |
| 19 | 4 | 2 |
| 20 | 3 | 2 |
| 21 | 2 | 2 |

EXAMPLE 16

The additives listed in Table 7 are sprinkled dry in a concentration of 1% on polyamide 12 granules (relative viscosity=1.9; 0.5% in m-cresol) and the coated granules are regranulated in each case at 260° C. in a single screw extruded. Tensile bars 1 mm. thick are extruded from the granules at 240° C. in an injection moulding machine (Arburg); dimension of each bar: 30 x 6 mm.

The test of the effectiveness of the additive incorporated in the test specimens is carried out by oven ageing in a forced draught oven at 160° C. The thermo-oxidative degradation of the material during the oven ageing is followed up in two different ways:

(a) by periodic measurement of the relative viscosity of a 0.5% solution in m-cresol (Table 7, columns 2 to 17);
(b) by periodic determination of the tensile strength and of the time taken to the decrease in yield stress to 80% of its initial value (Table 7, column 8).

TABLE 7

| Stabilizer No., concentration 1% | (a) Relative viscosity of solution after days of oven aging at 160° C. | | | | | | (b) Days to 80% residual yield stress |
|---|---|---|---|---|---|---|---|
| | 0 | 3 | 5 | 7 | 9 | 12 | |
| Without additive | 1.95 | 1.5 | | | | | 0.5 |
| 1 | 1.90 | 1.84 | 1.80 | 1.76 | 1.72 | 1.66 | 20 |
| 4 | 1.95 | 1.84 | 1.77 | 1.74 | 1.70 | 1.65 | 18 |

EXAMPLE 17

The additives listed in Table 8 are sprinkled dry in a concentration of 0.5% on dried polyamide 6 granules (relative viscosity=2.9, 1% in concentrated sulphuric acid) and the coated granules are regranulated in a single screw extruder at 260° C. Pressed sheets (0.3 mm.) are then manufactured likewise from the granules and 1 cm. wide test strips are punched from these sheets.

The test of the effectiveness of the additives incorporated into the test specimens is carried out by means of oven ageing in a forced draught oven at 154° C. The thermooxidative degradation of the material during the oven ageing is followed up by periodic measurement of the relative viscosity of a 1% solution in 96% sulphuric acid, in the process of which the time is ascertained after which the relative viscosity falls from 2.9 to a value of 2.0 (Table 8).

TABLE 8

| Stabilizer No.: | Oven ageing time at 165° C. for fall of relative viscosity of solutions from 2.9 to 2.0 in hours |
|---|---|
| Without additive | 5 |
| 1 | 50 |
| Stabilizer No.: | Comparative products |
| 14 | 12 |
| 16 | 40 |
| 17 | 30 |
| 19 | 40 |
| 21 | 20 |
| 25 | 12 |

EXAMPLE 18

100 parts of polypropylene (melt index 3.2 g./10 mins., 230° C./2160 g.) are thoroughly mixed for 10 minutes in a shaking apparatus with 0.2 part of one of the additives listed in the following Table 9.

The resulting mixture is kneaded for 10 minutes at 200° C. in a Brabender plastograph and the composition thus obtained is subsequently pressed to 1 mm. thick sheets in a day-light press at a temperature of 260° C. Strips 1 cm. wide and 17 cm. long are punched from these sheets.

The test of the effectiveness of the adidtive incorporated in the test strips is carried out by means of oven ageing in a forced draught oven at 135° C. and 149° C., a test strip which contans no additive serving as comparison. Three test strips of each formulation are used for this purpose. The end point is defined as the onset of the slightly visible decomposiiton of the test strip. The results are indicated in days.

TABLE 9

| Stabilizer No. | Days to onset of decomposition | |
| --- | --- | --- |
|  | 149° C. | 135° C. |
| Without additive | 1/2 | 1 |
| 1 | 8 | 52 |
| 9 | 15 | 98 |
| Comparative products | | |
| 20 | 5 | 40 |
| 17 | 2 | 10 |

EXAMPLE 19

The test specimens described in Example 18 were further tested for their colour stability, as follows:

(a) after incorporation (Table 10, column 2);
(b) after 500 hours exposure in a xenotest device of Messrs. Hanau (Table 10, column 3);
(c) after a 1 week treatment with boiling water (Table 10, column 4).

For Table 10 an empirical colour scale was used in which 5 denotes colourlessness, 4 a just perceptible, slight discolouration, and 3, 2 and 1 denote successively stronger discolouration.

TABLE 10

| Stabilizer No. | Colour evaluation according to the scale 1-5 | | |
| --- | --- | --- | --- |
|  | After incorporation | After exposure | Boiling water 1 week |
| 1 | 4 | 5 | 4 |
| 9 | 4 | 5 | 4 |
| Comparative products | | | |
| 20 | 2 | 3 | 1 |
| 17 | 4 | 4 | 4 |

EXAMPLE 20

100 parts of polypropylene (melt index 3.2 g./10 mins., 230° C./2160 g.) are thoroughly mixed for 10 minutes in a shaking apparatus with 0.1 part of one of the additives in the following Table 11 and 0.3 part of dilaurylthiodipropionate.

The resulting mixture is kneaded for 10 minutes at 200° C. in a Brabender plastograph and the composition thus obtained is subsequently pressed in a day-light press at 260° C. to 1 mm. thick sheets from which strips 1 cm. wide and 17 cm. long are punched.

The test of the effectiveness of the additives incorporated in the strips is carried out by means of oven ageing in a forced draught oven at 135° C. and 149° C., with a test strip which contains only 0.3 part of dilaurylthiodipropionate being used as comparison. For this purpose, three test strips of each formulation are used. The end point is defined as the onset of the slightly visible decomposition of the test strip, the results being given in days.

TABLE 11

| Stabilizer No. | Days to onset of decomposition | |
| --- | --- | --- |
|  | 149° C. | 135° C. |
| Without additive | 5 | 11 |
| 1 | 20 | 95 |
| 9 | 28 | 115 |
| Comparative products | | |
| 20 | 13 | 65 |
| 17 | 8 | 37 |

EXAMPLE 21

0.25 part of each of the additives listed in Table 12 is dissolved cold in 100 parts of a 25% polyurethane solution (Estane 5707, Messrs. Goodrich). Using a film drawing device, films about 400µ thick are drawn from these solutions on a glass plate and which, after being dried for about 10 minutes at 140° C. in a forced draught oven, dry out to films having a thickness of 100µ. The stabilizers are accordingly present in the films in a concentration of 1.0%. Samples of these films are exposed in a xenotest device on a white cardboard background until the onset of visually perceptible yellowing. The results of Table 12 are given in hours.

TABLE 12

| Stabilizer No. | Exposure time¹ | Comments |
| --- | --- | --- |
| Without additive | 100 |  |
| 1 (0.5%) | 300 |  |
| 1 | 400 |  |
| 1 plus 22 | 700 |  |
| Comparative products | | |
| 14 | 250 |  |
| 14 plus 22 | 500 |  |
| 15 plus 22 | 300 |  |
| 17 | 200 |  |
| 17 plus 22 | 400 |  |
| 19 | 150 |  |
| 19 plus 22 | 250 |  |
| 24 | 200 | Incompatible. |
| 24 plus 22 | 400 | Do. |
| 16 | 150 | Do. |
| 16 plus 22 | 250 | Do. |
| 25 plus 22 | 250 | Do. |
| 22 | 200 | Do. |

As may be seen from Table 12, the stabilizer according to the invention effects excellent protection against the yellowing of polyurethane films, both when it is used alone and in combination with co-additives.

EXAMPLE 22

Protection against yellowing of polyacrylonitrile (PAN)

0.5 part of stabilizer 1 together with 25 parts of PAN are dissolved over 4 hours in 75 parts of dimethyl formamide (DMF) at 70° C. In a visual comparison, the stabilized solution already shows a distinctly brighter colour than the solution which is free from additive. Films about 500µ thick are drawn on a glass plate from these solutions and dried for 10 minutes at 125° C.

The dried films are visually assessed on a white background for their degree of yellowing as shown below:

TABLE 13

Discolouration

Additive-free comparative colour -- Yellow.
0.5% of stabilizer 1 -------------- White with very faint trace of yellowing.

The same results are obtained if another solvent, for example ethylene carbonate/water mixture (80:20), is used instead of dimethyl formamide.

EXAMPLE 23

Stabilizer 1 (0.3%) is sprinkled on unstabilized ABS resin and the coated granules are regranulated at 240° C. in a single screw extruder. For purpose of comparison, granules without stabilizer 1 are manufactured in the same manner. The granules are extruded in the conventional manner in an injection molding machine at 250° C. to sheets. The sheets are aged in a forced draught oven for 10 days at 80° C. and the colour behaviour evaluated.

TABLE 14

| | Colour of the sheets | |
| --- | --- | --- |
|  | Original state | After 10 days at 80° C. |
| Without stabilizer | Yellowish beige | Brownish yellow. |
| 0.3% stabilizer 1 | Light beige | Light beige. |

By adding 0.3% of stabilizer 1 the colour of ABS in the original state is improved and discolouration during oven ageing prevented.

EXAMPLE 24

Stabilizing against degradation of polypropylene during processing

The stabilizers of Table 15 below are homogeneously mixed in the given concentrations with polypropylene powder ("Propathene HF20," ICI) and regranulated 5 times successively in a single screw extruder at a maximum temperature of 260° C. and at 100 r.p.m. The melt index (MI) of the material is measured in each case after the 1st, 3rd and 5th extrusion (2160 g. load at 230° C.; g./10 mins.). A degradation of the polymer is expressed in a rapid rise of the melt index.

TABLE 15

| Stabilizer No. (concentration) | MI/2,160 g. at 230° C. in g./10 minutes | | | |
|---|---|---|---|---|
| | Original state | 1st extrusion | 3rd extrusion | 5th extrusion |
| Without stabilizer | 2.50 | 5.30 | 27.2 | 38.5 |
| 1 (0.1%) | 2.50 | 3.16 | 4.80 | 6.55 |
| 1 (0.05%) | 2.50 | 3.95 | 6.34 | 9.40 |
| 14 (0.05%) plus 1 (0.05%) | 2.50 | 3.58 | 4.90 | 6.94 |
| 24 (0.05%) plus 1 (0.05%) | 2.50 | 2.50 | 4.64 | 7.05 |
| 16 (0.05%) plus 1 (0.05%) | 2.50 | 2.50 | 4.36 | 6.46 |
| 19 (0.05%) plus 1 (0.05%) | 2.50 | 2.92 | 4.96 | 7.54 |
| 25 (0.05%) plus 1 (0.05%) | 2.50 | 4.11 | 5.22 | 8.25 |
| Comparative products | | | | |
| 14 (0.1%) | 2.50 | 4.10 | 7.37 | 10.7 |
| 24 (0.1%) | 2.50 | 4.44 | 8.26 | 13.40 |
| 16 (0.1%) | 2.50 | 3.87 | 6.82 | 10.4 |
| 19 (0.1%) | 2.50 | 4.26 | 8.10 | 12.76 |
| 25 (0.1%) | 2.50 | 5.95 | 8.10 | 10.45 |

As is evident from the figures of Table 15, the stabilizer 1 according to the invention improve the stability of the polymer not only when used alone, but also in combination with conventional phenolic antioxidants.

In addition to stabilizing the melt index, stabilizer 1 effects a distinct improvement in colour, even after multiple extrusion, in comparison to unstabilized material.

EXAMPLE 25

Stabilizing of EPDM (a) Manufacture of the test specimens.—100 parts of unstabilized ethylene-propylene-rubber and 0.1 part of each of the stabilizers listed in Table 16 are homogenized for 10 minutes at 150° C. and 60 r.p.m. in a Brabender plastograph fitted with a roll kneader type 50EC. The thus stabilized mixtures are pressed to 1 mm. thick sheets in a day-light press at 120° C. for 5 minutes. The unstabilized rubber sheet which is used for comparison is manufactured in the same manner.

(b) Test.—The gel content determined after storage in air at elevated temperatures serves as yardstick for evaluating the protective action of the incorporated stabilizers. For this purpose, the test specimens obtained as described above are kept on an aluminium base in a forced draught oven at 100 and examined after 5 and 10 days for their gel content, which is determined as follows:

About 1 g. of the specimens are cut into pieces of about 3 x 3 x 1 mm. and dissolved overnight at room temperature in 100 ml. of n-hexane. These solutions are filtered through glass wool and the gel particles retained by the glass wool are washed with 3 x 20 ml. of n-hexane. The filtered solutions are evaporated to dryness and dried to constant weight. The gel content of the test specimen is obtained by the following calculation:

$$\text{gel content in percent} = \frac{E-A}{E} \cdot 100$$

wherein

E = total weight of the tested specimen
A = weight of the dissolved portion of the tested specimen.

The results of the gel determination after oven aging are summarized in the following Table 16:

TABLE 16

| Stabilizer number | Gel content in percent after ageing in air at 100° C. | | | |
|---|---|---|---|---|
| | 5 days | 10 days | 15 days | 20 days |
| Without stabilizer | 2 | 84 | 83 | 81 |
| 1 | 0 | 0 | 1 | 1 |
| 11 | 0 | 1 | 1 | 2 |
| Comparative products | | | | |
| 15 | 4 | 65 | 85 | 85 |
| 23 | 5 | 85 | 84 | 80 |
| 24 | 0 | 3 | 10 | 15 |

EXAMPLE 26

Stabilizing of impact resistant polystyrene 100 parts of impact resistant polystyrene containing about 8 parts of polybutadiene are mixed dry in a mixing device with 0.1 part of each of the 17 stabilizers listed in Table 17 and these mixtures are then homogenized at 220° C. for 30 minutes in a Brabender plastograph (roll kneader 50 EC). The material is subsequently pressed to 1 mm. sheets at 220° C. and assessed visually for discolouration which has occurred during the Brabender treatment. For comparative purposes, unstabilized polymer is subjected to the same treatment. The results are summarized in the following Table 17:

TABLE 17

| Stabilizer No.: | Color after Brabender treatment 30 minutes at 220° C. |
|---|---|
| Without stabilizer 1. | White, opaque (no change in color compared with a test specimen without Brabender treatment). |

EXAMPLE 27

Stabilizing of polystyrene 100 parts each of crystal clear polystyrene granules are mixed dry in a mixer with the following additives:

mixture I: no additive
mixture II: 0.25 part of stabilizer No. 22 (UV rays absorbing agent)
mixture III: 0.25 part of stabilizer No. 1
mixture IV:
    0.15 part of stabilizer No. 22
    0.1 part of stabilizer No. 1

These mixtures are granulated in an extruder and then extruded at 280° C. in an injection moulding machine to sheets about 1.5 mm. thick.

The resulting sheets are exposed for 1500 hours in a xenotest device (type 150) and the yellowing which occurs is determined by means of the yellowing factor YF as follows:

$$YF = \frac{\Delta T_{420} - \Delta T_{680}}{T_{560}} \cdot 100$$

wherein T denotes the transmission losses which have occurred as a result of exposure measured in the wave lengths 420 and 680 nm., and $T_{560}$ denotes the transmission value in percent of an unexposed test specimen measured in the wave length of 560 nm. The yellowing factors calculated from the transmission measurements of the exposed test specimens are summarised in the following Table 18:

TABLE 18

| Mixture No.: | Yellowing factor after 150° C. hours xenotest 150 |
|---|---|
| I | 20.6 |
| II | 3.3 |
| III | 12.4 |
| IV | 1.7 |

The results show that the partial replacement of the UV rays absorbing agent (stabilizer No. 22) by the stabilizer No. 1 gives a better protection against yellowing than each of the individual components.

EXAMPLE 28

Stabilizing against cross-linking of high molecular low pressure polyethylene during processing 0.05% of stabilizer 1 is homogeneously mixed with the polyethylene powder (MG~250,000) and the mix is regranulated in a single screw extruder at a maximum mium laurate, 0.66 part of barium laurate and 0.3 part by weight of a co-stabilizer were mixed for 5 minutes at 165° C. in a laboratory roll mill. The sheets obtained in this way were subjected to a heat test in an oven of constant temperature at 180° C., by taking samples from the oven at intervals of 15 minutes and determining the degree of decomposition. Stabilizer 1 or bisphenol A was used as costabilizer. The following Table 21 gives the visually recognizable degree of decomposition with the stabilizer according to the invention and the comparative stabilizer bisphenol A:

TABLE 21

| Costabilizer | Rolled sheet | 15' | 30' | 45' | 60' | 75' | 90' | 105' | 120' | 135' |
|---|---|---|---|---|---|---|---|---|---|---|
| Stabilizer 1 | Colourless | Colourless | Colourless | Colourless | Colourless | Faintly yellow | Faintly yellow | Faintly yellow | Yellowish brown | Black |
| Bisphenol A | do | do | do | Faintly yellow | Faintly yellow | do | Yellowish brown | Black | | | temperature of 200° C. and 100 r.p.m. For comparison, granules without addition of stabilizer 1 is manufactured in the same manner. The melt index (MI) of the starting material and the extruder granules was determined.

The oxidative daamge to the polymer material caused by the thermal stress during the extrusion effects a cross-linking of the polymer and is expressed by a sharply increased viscosity of the polymer melt and thus a greatly reduced melt index. (Table 19.)

TABLE 19

| | MI (10 kg. at 230° C.) g./10 minutes | |
|---|---|---|
| | Original state | After extrusion |
| Without stabilizer | 0.5 | 0.1 |
| 0.05% of stabilizer 1 | 0.5 | 0.5 |

In addition to stabilizing the melt index, stabilizer 1 effects a distinct improvement in color after the regranulation in comparison to unstabilized material.

EXAMPLE 29

Stabilizing of very high molecular polyethylene against crosslinking during thermal-mechanical stress 0.3 part of stabilizer 1 is mixed dry with 100 parts of high molecular polyethylene (MG~1,000,000) and the mix is subsequently kneaded for a total of 7 minutes at 240° C. and 40 r.p.m. in a Brabender plastograph. The thus treated mixture is pressed into sheets and examined for its gel content. For this purpose, the material in the form of fine chips is extracted for 10 hours with xylene and the residue left after the extraction is determined; this residue constitutes the crosslinked, insoluble gel portion. For comparison, a mixture which contains no stabilizer is treated in the same manner. The results are summarized in the following Table 20:

TABLE 20

| Stabilizer No.: | Gel content after Brabender treatment, 7 mins./240° C., 40 r.p.m. |
|---|---|
| Without additive | 0 |
| Unkneaded | 44 |
| With 0.3% stabilizer 1 kneaded | 0 |
| With 0.3% stabilizer 14 kneaded | 8 |

EXAMPLE 30

Stabilizing of polyvinyl chloride 70 parts by weight of polyvinyl chloride (Solvic 239) manufactured by the suspension process, 30 parts by weight of dioctyl phthalate, 0.44 part by weight of cad- mium laurate, 0.66 part of barium laurate and 0.3 part by weight of a co-stabilizer were mixed for 5 minutes at 165° C. in a laboratory roll mill. The sheets obtained in this way were subjected to a heat test in an oven of constant temperature at 180° C., by taking samples from the oven at intervals of 15 minutes and determining the degree of decomposition. Stabilizer 1 or bisphenol A was used as costabilizer. The following Table 21 gives the visually recognizable degree of decomposition with the stabilizer according to the invention and the comparative stabilizer bisphenol A:

As may be seen from the table, a substantially greater heat stabilizing action is achieved with the stabilizer according to the invention than with a conventional commercial stabilizer.

EXAMPLE 31

Stabilizing of polyethylene terephthalate

In a stirring autoclave, 235 parts of dimethyl terephthalate are transesterified in the presence of 0.04 part of zinc acetate and 0.06 part of antimony trioxide with 170 parts of ethylene glycol at temperatures of 150° C. to 210° C., in the process of which the methanol which is liberated is distilled off over a suitable column. For the subsequent polycondensation, the transesterification product is heated gradually while stirring to 285° C., the pressure simultaneously gradually reduced to 0.5 torr and these conditions are kept for 5 hours. In the process a polyester is obtained with a relative viscosity of 1.65 (1% in m-cresol, 25° C.) and a yellowish natural colour.

If the process described above is repeated, except that 0.26 part of the stabilizer 1 (dissolved in ethylene glycol) is added about half way through the polycondensation, a polyester with the relative viscosity of 1.60 is obtained after completion of the usual reaction time, but whose natural colour is very much brighter than that of the comparative test specimen which contains no additive. The same applies for the filaments spun from the two polyester test specimens.

EXAMPLE 32

Protection against yellowing of dimethyl terephthalate

The dimethyl terephthalate together with the additives listed in Table 22 in a concentration of 0.01% kept for 20 hours at 200° C. in a glass tube under nitrogen. The yellowings which have occurred during this treatment are evaluated according to an empirical colour scale in which 5 denotes colourlessness, 4 a just perceptible, slight discolouration, and 3, 2 and 1 successively denote stronger discolouration.

TABLE 22

| Additives: | Yellowing rating |
|---|---|
| Without additive | 1 |
| Tris-nonylphenylphosphite | 2 |
| 4-hydroxy-3,5-ditert.butylbenzyl-phosphoric diethyl ester | 3–4 |
| Stabilizer 1 | 5 |

EXAMPLE 33

100 parts of polypropylene (melt index 20 g./10 mins., 230° C./2160 g.) are thoroughly mixed in a shaking apparatus for 10 minutes with 0.2 part of the stabilizer No. 24 and 0.5 part of stabilizer No. 8.

The resulting mix is kneaded for 10 minutes at 200° C. in a Brabender plastograph, the composition thus obtained then in a precision press at 260° C. to 0.1 mm. thick sheets which are subsequently kept in an oven for 1 hour at exactly 150° C. and then chilled in tap water (temperature about 13° C.). Test specimens measuring 44 x 60 mm. are cut from the resulting sheets.

The test of stabilizer No. 8 for its effectiveness as stabilizer against damaging effects on exposure of the polymer is carried out in an exposure device of type "Xenotest 150" (Hanau), with a sheet which contains only stabilizer No. 24 being used for comparison. To determine the end point, tensile bars 40 mm. long are punched from the exposed sheets and examined periodically for their elongation. The end point is reached as soon as the residual elongation has sunk to 50% of its initial value.

TABLE 23

| Stabilizer No.: | Hours to 50% residual elongation |
| --- | --- |
| 24 (0.2%) | 800 |
| 24 (0.2%)+8 (0.5%) | 2070 |

The results show that the addition of 0.5% of stabilizer No. 8 effects a light fastness of polypropylene which corresponds to about 2.6 times the value of an unstabilized test specimen.

EXAMPLE 34

100 parts of polycarbonate powder ("Lexan 145–111," General Electric, which had been dried previously in a vacuum oven for 12 hours at 120° C.) are thoroughly mixed for 10 minutes in a shaking apparatus with 0.1 part of stabilizer No. 1. The resulting mix is extruded in a laboratory single screw extruder ("Killion") at 290° C. nozzle temperature and 110 r.p.m. and subsequently granulated. The granules required for purposes of comparison without addition of the stabilizer are manufactured in analogous manner. Before the further processing, the granules are dried in a vacuum oven for 12 hours at 120° C.

The test of the effectiveness of the incorporated stabilizer No. 1 as stabilizer against the yellowing of material under extreme thermal stress takes place in a laboratory injection moulding machine at 315° C. The yellowing is evaluated on the moulded sheets according to the Hunter Scale (Wyszecki-Stiles, Colour Science, John Wiley, New York, page 460) after increasing retention times in the injection cylinder. Yellowing is represented by *descending values* on the Hunter Scale (Table 24).

TABLE 24

| Stabilizer number | Hunter values according to the given retention times in the cylinder after— | | | | | |
| --- | --- | --- | --- | --- | --- | --- |
| | 2 mins. | 5 mins. | 10 mins. | 15 mins. | 20 mins. | 25 mins. |
| Without stabilizer | 64 | 59 | 48 | 41 | 35 | 34 |
| 1 (0.1%) | 81 | 81 | 80 | 82 | 80 | 80 |

The results show that stabilizer No. 1 practically completely suppresses the yellowing tendency of polycarbonate at the high temperatures necessary for the processing.

EXAMPLE 35

Stabilizing of styrene-butadiene copolymers (SBR)

(a) Manufacture of test specimens.—100 parts of an unstabilized styrene-butadiene rubber (emulsion SBR "Synpol 1500," Texas U.S. Chem. Corp.) are homogenized for 10 minutes in a Brabender plastograph at 150° C. and 60 r.p.m. with 0.125 part each of the stabilizers listed in Table 25. The thus stabilized mixtures are pressed to 1 mm. thick sheets in a day-light press at 120° C. for 5 minutes. The unstabilized rubber sheet which is used as comparison is manufactured in the same manner.

(b) Test.—The gel content determined after storage in air at elevated temperatures serves as yardstick for evaluating the protective action of the incorporated stabilizers. For this purpose, the test specimens obtained above are kept on an aluminium base in a forced draught oven at 100° C. and examined periodically (about every 10 hours) for their gel content, which is determined as follows:

About 1 g. of the test specimens are cut in pieces about 3 x 3 x 1 mm. in size and dissolved overnight at room temperature in 100 ml. of n-hexane. These solutions are filtered through glass wool, the gel particles which have been retained by the glass wool are washed with 3 × 20 ml. of n-hexane. The filtered solutions are evaporated to dryness and dried to constant weight. The gel content of a test specimen is then obtained according to the following calculation:

$$\text{gel content in percent} = \frac{E-A}{E} \cdot 100$$

wherein

E = total weight of the tested specimen
A = weight of the dissolved portion of the tested specimen.

The end point is defined as the time after which a sudden rise in the gel content occurs after an induction period characteristic for the tested additive. (Table 25.)

TABLE 25

| Stabilizer No. (0.125%): | Induction period to the rapid occurrence of a high gel content, hours |
| --- | --- |
| Without stabilizer | 5 |
| 1 | 40 |
| 2 | 35 |
| 24 | 20 |

I claim:
1. Compounds of the General Formula I

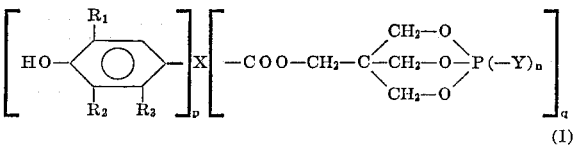

(I)

wherein X represents the radical of an alkane containing from 1–19 carbon atoms, and in which radical not more than three bonds are formed between the same carbon atoms and the carboxyl and phenol groups, the radical of an aralkane, alkene, oxaalkane or thiaalkane each containing from 2–19 carbon atoms, and in which radicals not more than three bonds are formed between the same carbon atom and the carboxyl and phenol groups, or represents the direct bond, $R_1$ and $R_2$ independently represent hydrogen, alkyl containing from 1–8 carbon atoms, cycloalkyl containing from 6–8 carbon atoms or aralkyl containing from 7–9 carbon atoms, $R_3$ represents hydrogen or methyl, Y represents oxygen or sulphur, $p$ and $q$ independently represent 1 or 2 and $n$ represents 0 or 1.

2. Compounds according to claim 1 for the Formula I, wherein X represents the radical of an alkane containing from 1–19 carbon atoms, and in which radical not more than three bonds are formed between the same carbon atoms and the carboxyl and phenyl groups, of an alkene, oxaalkane or thiaalkane each containing from 2–19 carbon atoms and in which radicals not more than three bonds are formed between the same carbon atoms and the carboxyl and phenyl groups, or represents the direct bond, $R_1$ represents alkyl containing from 1–8 carbon atoms, cycloalkyl containing from 6–8 carbon atoms or aralkyl containing from 7–9 carbon atoms, $R_3$ represents hydrogen, Y represents oxygen or sulphur, $p$ and $q$ independently represent 1 or 2 and $n$ represents 0 or 1.

3. Compounds according to claim 1 of the Formula I, wherein X represents the radical of an alkane containing from 1–9 carbon atoms, of an alkene, oxaalkane or thiaalkane each containing from 2–9 carbon atoms and in which radicals not more than two bonds are formed between the same carbon atoms and the carboxyl and phenyl groups, or represents the direct bond, $R_1$ represents alkyl containing from 1–5 carbon atoms or cycloalkyl containing from 6–8 carbon atoms, $R_2$ represents hydrogen, alkyl containing from 1 to 5 carbon atoms or cycloalkyl containing from 6–8 carbon atoms, $R_3$ represents hydrogen, Y represents oxygen or sulphur, $p$ and $q$ independently 1 or 2 and $n$ represents 0.

4. Compounds according to claim 1 of the Formula I, wherein X represents the radical of an alkane containing from 1–6 carbon atoms, of an alkene containing from 2–5 carbon atoms or of an oxaalkane or thiaalkane each containing from 2–5 carbon atoms, in which radicals not more than two bonds are formed between the same carbon atom and the carboxyl and phenol groups, or represents the direct bond, $R_1$ represents alkyl containing from 1–5 carbon atoms or cycloalkyl containing from 6–8 carbon atoms, $R_2$ represents hydrogen, alkyl containing from 1–5 carbon atoms or cycloalkyl containing from 6–8 carbon atoms, $R_3$ represents hydrogen, Y represents oxygen or sulphur, $p$ and $q$ independently represent 1 or 2 and $n$ represents 0 or 1.

5. Compounds according to claim 1 of the Formula I, wherein X represents the radical of an alkane containing from 1–3 carbon atoms and in which radical not more than two bonds are formed between the same carbon atoms and the carboxyl and phenol groups, —CH=CH—, —CH$_2$—S—CH$_2$—, or represents the direct bond, $R_1$ represents alkyl containing from 1–4 carbon atoms, $R_2$ represents hydrogen or alkyl containing from 1–4 carbon atoms, $R_3$ represents hydrogen, Y represents oxygen or sulphur, $p$ and $q$ independently represent 1 or 2 and $n$ represents 0 or 1.

6. Compounds according to claim 1 of the Formula I, wherein X represents the direct bond or one of the radicals

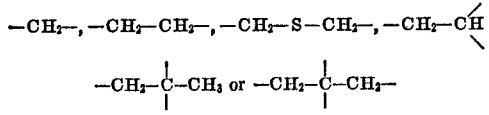

$R_1$ represents methyl, isopropyl or tert. butyl, $R_2$ represents hydrogen, methyl, isopropyl or tert. butyl, $R_3$ represents hydrogen, $p$ and $q$ independently represent 1 or 2 and $n$ represents 0.

7. 4 - hydroxymethyl-1-phospha - 2,6,7 - trioxabicyclo[2,2,2]octane-3-(3,5 - ditert.butyl-4-hydroxyphenyl)-propionate.

8. 4 - hydroxymethyl-1-phospha - 2,6,7 - trioxabicyclo[2,2,2]octane-3-(3-tert.butyl - 4 - hydroxy-5-methylphenyl)propionate.

9. 4 - hydroxymethyl-1-phospha - 2,6,7 - trioxabicyclo[2,2,2]octane-3-(3,5 - diisopropyl-4-hydroxyphenyl)-propionate.

10. 4-hydroxymethyl-1-phopsha - 2,6,7 - trioxabicyclo[2,2,2]octane-3,5-ditert.butyl-4-hydroxybenzoate.

11. Bis - (4-hydroxymethyl-1-phospha-2,6,7-trioxabicyclo[2,2,2]octane) - bis - (3,5-ditert.butyl-4-hydroxybenzyl)-malonate.

12. A process for the manufacture of compounds of claim 1, said process consisting essentially of reacting 1 mole of a phosphite of the formula

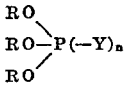

wherein R is alkyl or aryl group, with 1 mole of pentaerythritol and at the same time or subsequently with ½ or 1 mole of a compound of the formula

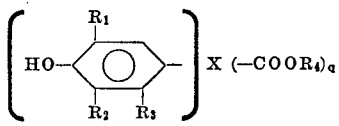

wherein $R_4$ is a lower alkyl group and $R_1$, $R_2$, $R_3$ and $q$ are as defined in claim 1, said process being carried out in the presence of a basic catalyst and at a temperature of from about 20° C. to 160° C.

References Cited
UNITED STATES PATENTS 2,643,261   6/1953   Matuszak et al. ___ 260—937 X
3,287,448   11/1966  Ratz _____ 260—937

ANTON H. SUTTO, Primary Examiner

U.S. Cl. X.R.

252—400; 260—937, 971, 982, 45.7 P, 45.7 PS